United States Patent [19]

Larson et al.

[11] Patent Number: 4,822,695

[45] Date of Patent: Apr. 18, 1989

[54] LOW POROSITY SURFACING ALLOYS

[75] Inventors: Jay M. Larson; Keith E. Mengel, both of Marshall, Mich.

[73] Assignee: Eaton Corporation, Cleveland, Ohio

[21] Appl. No.: 193,160

[22] Filed: May 6, 1988

Related U.S. Application Data

[63] Continuation-in-part of Ser. No. 029,113, Mar. 23, 1987, abandoned.

[51] Int. Cl.$^4$ .................. B32B 15/01; B32B 15/02; C22C 30/00; C22C 38/02
[52] U.S. Cl. .................................. 428/687; 420/52; 420/53; 420/584
[58] Field of Search ............... 420/584, 12, 50, 52, 420/53; 428/687

[56] References Cited

U.S. PATENT DOCUMENTS

| | | | |
|---|---|---|---|
| 1,876,411 | 9/1932 | Gregg et al. | 420/53 |
| 2,292,740 | 8/1942 | Cape et al. | 420/52 |
| 2,370,124 | 2/1945 | Charlton | 420/12 |
| 2,709,132 | 5/1955 | Giles | 420/12 |
| 3,859,083 | 1/1975 | Kusaka et al. | 420/52 |
| 3,925,065 | 12/1975 | Osawa et al. | 420/12 |
| 4,086,107 | 4/1978 | Tanino et al. | 420/50 |
| 4,122,817 | 10/1978 | Matlock | 420/12 |
| 4,200,457 | 3/1980 | Cape | 420/584 |

FOREIGN PATENT DOCUMENTS

| | | | |
|---|---|---|---|
| 0153872 | 9/1984 | Japan | 420/53 |
| 0229470 | 12/1984 | Japan | 420/53 |
| 0306183 | 6/1971 | U.S.S.R. | 420/53 |

*Primary Examiner*—L. Dewayne Rutledge
*Assistant Examiner*—David Schumaker
*Attorney, Agent, or Firm*—A. E. Chrow

[57] ABSTRACT

Provided are improved nickel-based surfacing alloys containing from about 0.2% to about 5.0% by weight of either or both hafnium and niobium to the total alloy weight and iron-based surfacing alloys containing the combination of about 1.5% to about 2.5% by weight carbon in conjunction with from about 1.0% to about 2.5.% silicon whereby both types of alloys are characterized by having reduced porosity arising during the process of depositing them in a molten state by a weld surfacing process upon a nitrogen containing steel substrate.

3 Claims, 1 Drawing Sheet

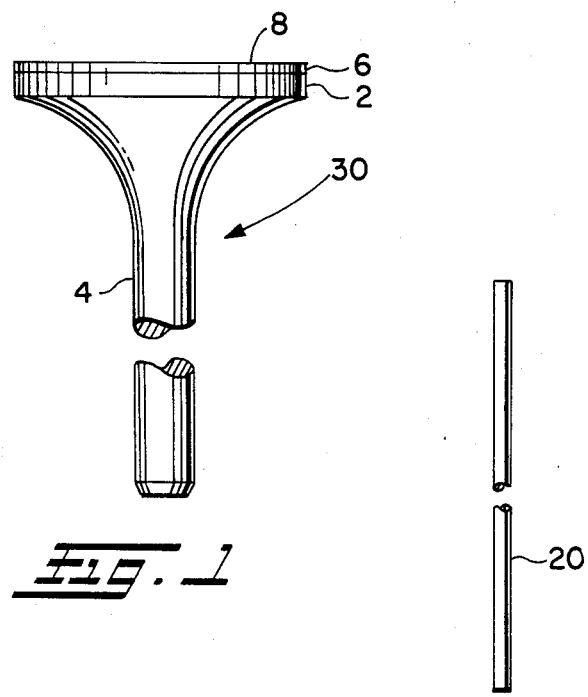
Fig. 1
Fig. 3
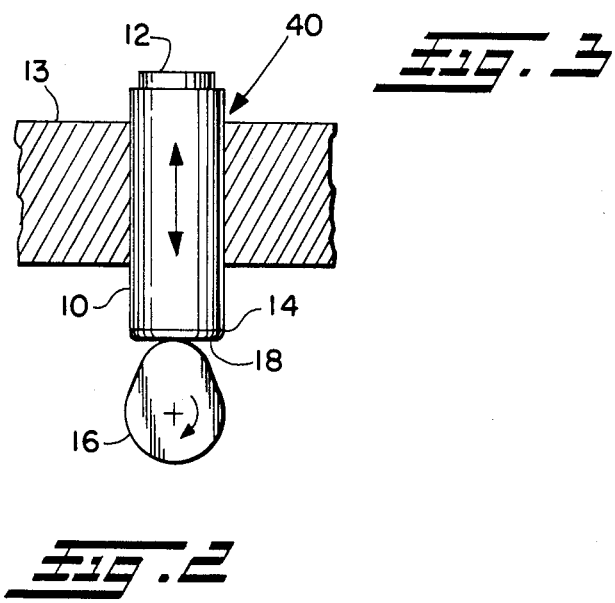
Fig. 2

LOW POROSITY SURFACING ALLOYS

This application is a continuation-in-part of application Ser. No. 029,113 filed Mar. 23, 1987, now abandoned.

INTRODUCTION

This invention relates generally to metallic alloys adapted to be united or joined by coalescence to a steel substrate by a weld surfacing process to provide a wear resistant surface thereupon and more particularly to improved metallic alloys adapted to provide a wear resistant surface having substantially reduced porosity arising from liberation of nitrogen from a nitrogen containing steel substrate such as an engine valve or an engine valve lifter body or cam face upon which the metallic alloy is deposited during the welding process.

BACKGROUND OF THE INVENTION

Steel alloys have been used for many years to make engine components such as valves and valve lifters. Although such steel may be suitable in many applications, it has been common practice to provide a high wear resistant surface of specialized steel alloys particularly to the seat face of engine valves and the cam surface of engine valve lifters where such are used in rugged applications such as characteristically associated with gasoline and diesel engines.

The wear resistant surface alloy is characteristically deposited in a molten state upon the steel substrate by a welding process such as a oxy-acetylene or one of the arc welding or fusion welding processes well known to those skilled in the art. Welding processes used for the application of overlay surfaces are characteristically referred to as weld surfacing processes and differ from welding processes only by the deposition of a surfacing material rather than fusing independent members together.

One of the problems associated with welding such surfacing alloys onto steel alloy substrates is that often the steel substrate contains nitrogen which is liberated during the welding process and results in undesirable porosity in the surfacing alloy deposit reducing the surfacing deposit quality and potentially reducing corrosion and erosion resistance.

Two examples of iron based nitrogen containing steel alloys found particularly advantageous for use in making engine valves are described in U.S. Pat. No. 4,547,229, assigned to the assignee of the present invention and the disclosure of which is incorporated herein by reference. The first alloy having a composition similar to S.A.E. EV12 type, contains about 0.36% by weight nitrogen and the second alloy, comprising an iron based austenitic steel, contains about 0.28% by weight nitrogen.

Examples of iron-based alloys useful as casting or pad welding materials are respectively disclosed in Japanese Pat. Nos. 0153872 and 0229470, the disclosures of which are included herein by reference. The alloys however include tungsten in substantial amounts of from 0.1 to 10% by weight as an essential constituent. Tungsten has the ability to form stable carbides in carbon-containing metal alloys and to increase their solid solution strength. Tungsten however is expensive and has approximately twice the atomic weight of molybdenum which is known also for its ability to form stable carbides and to improve solid solution strength of carbon containing metal alloys. It has been discovered that the low porosity surfacing iron-based alloys of the invention herein described can be made without tungsten and therefore eliminate the expense and weight disadvantages associated therewith and, as such, are defined as being "substantially devoid of tungsten" meaning that if tungsten is present in the iron-based alloys of the invention, it is present only as an unavoidable trace contaminate in amounts characteristically less than about 0.01% by weight to the total weight of the alloy.

Another example of iron-based alloys having increased resistance to wear and to corrosion and erosion is disclosed in Soviet Union Pat. No. 0306183, the disclosure of which is included herein by reference. Here however the chromium content is limited to between 18 and 25% whereas the alloys of the invention employ from 25 to 30% and preferably from 26 to 28% by weight chromium in providing the low porosity surfacing alloys of the invention.

Metallic surfacing alloys of the type of interest to the present invention may be iron, chromium, and/or cobalt based but are more commonly nickel based and contain carbon, silicon and chromium in addition to a variety of additional constituents including nickel when the base constituent is other than nickel.

It has been discovered that porosity of the surfacing alloy can be substantially reduced when prescribed amounts of hafnium or niobium and mixtures thereof are added to nickel based surfacing alloys and where prescribed amounts of silicon are added to iron based facing alloys according to the amount of carbon contained in the alloy.

Hafnium (Hf) has an atomic number of 72 and is a quadravalent metal resembling zirconium having both basic and acidic properties. According to the "Encyclopedia of Material and Science Engineering", Michael B. Bern, Permagon Press, 1986, Hafnium is an additive in super alloys due to its ability to absorb neutrons.

Niobium (Nb), formerly known as columbium, has an atomic number of 41 and is found in nature principally as the oxide and has found use as an alloying component in heat resistant alloys, notably stainless steel. Niobium is used as a carbide stabilizer and grain refiner in alloying practice.

Silicon (Si) is well known in steel alloying practice and is reportedly one of the most important dioxidizers in steel making and will react with carbon at above about 1650° C. to form silicon carbide, the well known ceramic. Also well known is silicon nitride which is formed directly as a reaction product between silicon and nitrogen at a temperature above about 1200° C. Although having the known ability to react with nitrogen the ability of silicon to substantially reduce porosity in iron based surfacing alloys has been surprisingly discovered to rely upon the relationship between the amount of carbon and the amount of silicon present in the surfacing alloy and not merely upon the presence of silicon alone without such relationship.

SUMMARY OF THE INVENTION

Accordingly, it is an object of this invention to provide a wear resistant metallic surfacing alloy deposited by a weld surfacing process onto a nitrogen containing steel substrate that is characterized by having substantially reduced porosity.

It is another object of this invention to provide a metallic surfacing alloy containing a prescribed amount of selected constituents that are operative to substantially reduce porosity of the surfacing alloy heretofore arising by liberation of nitrogen from nitrogen containing steel substrates upon which the surface alloy is deposited by welding.

It is still another object of this invention to provide a nitrogen containing steel substrate such as an engine valve or valve lifter having a wear resistant metallic alloy deposited by a weld surfacing process thereupon that is characterized by having substantially reduced porosity by reason of including prescribed amounts of particular constituents included in the surfacing alloy.

BRIEF DESCRIPTION OF THE DRAWINGS

FIG. 1 shows a side elevation view of an engine valve having a wear resistant surface made from the alloy of the present invention deposited upon its seat;

FIG. 2 shows a side elevation view of an engine valve lifter having a wear resistant surface made from an alloy of the present invention deposited upon its cam face surface; and FIG. 3 shows a welding rod made from the surfacing alloys of the present invention.

BRIEF DESCRIPTION OF SOME PREFERRED EMBODIMENTS

Two examples of applications for which the surfacing alloys of the invention are particularly suited are shown in FIGS. 1 and 2 respectively.

An engine valve member 30 having a head portion 2 and a stem portion 4 is shown in FIG. 1. Valve 30 is provided with a seat face 2 that contacts the valve seat insert and is subjected to high heat, pressure, wear, corrosion and erosion which is particularly severe when the engine is a diesel engine. Valve member 30 is made from a nitrogen containing steel alloy such as previously described. In order to minimize wear and the described effects, seat face 6 is provided with a wear resistant surface 8 thereupon which is characterized by having substantially reduced porosity by reason of the surfacing alloy having been made in accordance with the invention which has been deposited by either oxyacetylene or one of the arc welding processes using a welding rod such as rod 20 shown in FIG. 3 or by other suitable means such as metallic powder, solid wire, or tublar wire.

FIG. 2 shows another application in which a valve lifter 40, well known to those skilled in the art, is reciprocally deposited in an opening through an engine housing 13 and is provided with body portion 10 including member 12 which actuates the engine valve in response to reciprocal movement of member 10. There are, of course, other types of valve lifters well known to those skilled in the art which are fixedly secured to the housing and which have internal parts which reciprocate to move the valve in the manner required. Although not ordinarily the case, lifter 40 is made, for illustrative purposes, from a nitrogen containing steel alloy. Lifter 40 is reciprocated by engagement between its lower surface 14 and a rotary cam 16 which is rotated by the engine due to wear upon surface 14. A wear resistant surface 18 made from the alloys of the present invention is deposited onto surface 14 by melting a welding rod made from the surfacing alloys of the invention or by other suitable means such as metallic powder, solid wire, or tubular wire. Surface 18 is substantially free of porosity arising by liberation of nitrogen from the nitrogen containing steel from which lifter 40 is made.

It has been discovered that porosity of the wear resistant surfacing alloy is substantially reduced when about 0.2% to about 5.0% and preferably from about 0.2% to about 4.0% by weight to the total alloy weight of hafnium or niobium and mixtures thereof is alloyed with a nickel-based alloy including at least the constituents carbon and chromium and preferably, with a nickel-based alloy containing at least about 40.0% (generally from about 40.0% to about 65.0%) by weight nickel in addition to the consituents:

| Constituent | % By Weight to Total Alloy Weight | |
|---|---|---|
| | From About | To About |
| Carbon | 0.2 | 3.0 |
| Silicon | 0.2 | 3.0 |
| Iron | 0.5 | 9.0 |
| Chromium | 18.0 | 35.0 |

Preferably, the above alloy further includes from about 0.05% to about 1.0% by weight manganese and/or from about 3.0% to about 10.0% molybdenum to the total weight of the alloy.

The nickel-based alloys of the invention described above may further include trace amounts of less than about 1.0% by weight of at least one of the constituents of phosphorous, sulfur, copper, titanium, aluminum, nitrogen, oxygen and mixtures thereof when more than one is employed.

An even further preferred nickel-based alloy made in accordance with the present invention contains from about 0.2% to about 5.0% and preferably from about 0.2% to about 4.0% by weight hafnium or niobium and mixtures thereof by weight to a nickel based alloy containing at least about 45.0% (generally from about 45.0% to about 62.0% by weight) to the total weight of the alloy in addition to the following constituents:

| Constituent | % By Weight to Total Alloy Weight | |
|---|---|---|
| | From About | To About |
| Carbon | 1.5 | 2.5 |
| Silicon | 1.5 | 2.0 |
| Iron | 5.0 | 6.0 |
| Chromium | 26.0 | 28.0 |

Again, the above described alloy preferably further includes from about 0.05% to about 1.0% by weight manganese and/or from about 3.0% to about 10.0% molybdenum to the total weight of the alloy.

Generally, the preferred amount of trace elements included in the alloys of the present invention is less than about: 0.03% for phosphorus; 0.02% for copper and sulfur; about 0.01% for titanium; 0.05% for nitrogen; 0.02% for oxygen; and about 0.01% for aluminum by weight to the total weight of the surfacing alloy.

A particularly preferred nickel based surfacing alloy containing at least about 45.0% nickel (generally from about 45.0% to about 62.0%) made in accordance with the invention by including from about 0.2% to about 5.0% and preferably from about 0.2% to about 2.5% by weight hafnium or niobium and mixtures thereof to the total weight of the alloy in addition to other constituents shown in following Table I:

TABLE I

| Constituent | % By Weight to Total Alloy Weight | |
| --- | --- | --- |
| | From About | To About |
| Carbon | 1.9 | 2.1 |
| Manganese | 0.45 | 0.55 |
| Phosphorus | 0.0 | 0.03 |
| Sulfur | 0.0 | 0.03 |
| Silicon | 1.5 | 2.0 |
| Chromium | 26.0 | 28.0 |
| Molybdenum | 4.5 | 5.5 |
| Iron | 5.0 | 6.0 |
| Titanium | 0.0 | 0.01 |
| Aluminum | 0.0 | 0.01 |
| Nickel | Balance | |

Iron based surfacing alloys made in accordance with the invention are substantially devoid of tungsten and include at least the constituents chromium and from about 1.5% to about 2.0% by weight carbon and about 1.0% to about 2.5% silicon.

More particularly, the iron-based alloys of the invention contain at least about 40.0% (generally from about 40.0% to about 55.0%) iron by weight to the total weight of the alloy in addition to the constituents shown in following Table II:

TABLE II

| Constituent | % By Weight to Total Alloy Weight | |
| --- | --- | --- |
| | From About | To About |
| Carbon | 1.5 | 2.0 |
| Chromium | 25.0 | 30.0 |
| Nickel | 14.0 | 18.0 |
| Silicon | 1.0 | 2.5 |

It has been surprisingly discovered that a substantial reduction in porosity occurs when the above described iron based alloys are welded onto nitrogen containing steel substrates when the alloy includes from about 1.0% to about 2.5% and preferably from about 1.5% to about 2.0% by weight silicon to the total weight of the surfacing alloy in conjunction with the carbon range indicated.

Preferably, the above described iron-based surfacing alloy further includes from about 3.5% to about 6.0% molybdenum and/or from about 0.3% to about 0.6% manganese and mixtures thereof to the total weight of the alloy.

Even more preferably, iron based surfacing alloys such as described above containing the prescribed amounts of carbon and silicon further include trace amounts of less than about 1.0% by weight to the total weight of the alloy of at least one of the constituents; phosphorous, sulfur, copper, aluminum, titanium, boron and mixtures thereof when more than one is employed.

Even more preferably, iron based surfacing alloys made in accordance with the invention contain at least about 45.0% by weight (generally from about 45.0% to about 55.0%) iron to the total weight of the alloy in addition to including the constituents shown in following Table III:

TABLE III

| Constituent | % By Weight to Total Alloy Weight | |
| --- | --- | --- |
| | From About | To About |
| Carbon | 1.5 | 1.7 |
| Chromium | 26.1 | 28.0 |
| Nickel | 15.0 | 16.0 |

To which is alloyed from about 1.0% to about 2.5% by weight silicon to the total weight of the alloy.

A particularly preferred embodiment of an iron-based facing alloy containing at least about 46.0% (generally from about 46.0% to about 52.0%) iron to the total weight of the alloy made in accordance with the invention in addition to the following constituents shown in following Table IV:

TABLE IV

| Constituent | % By Weight to Total Alloy Weight | |
| --- | --- | --- |
| | From About | To About |
| Carbon | 1.5 | 1.7 |
| Manganese | 0.45 | 0.55 |
| Chromium | 26.1 | 28.0 |
| Nickel | 15.0 | 16.0 |
| Molybdenum | 4.5 | 5.5 |
| Silicon | 1.5 | 2.0 |
| Phosphorous | 0.0 | 0.01 |
| Sulfur | 0.0 | 0.01 |
| Cadmium | 0.0 | 0.01 |
| Titanium | 0.0 | 0.01 |
| Aluminum | 0.0 | 0.01 |
| Boron | 0.0 | 0.05 |
| Iron | Balance | |

When nickel-based surfacing alloys containing the prescribed amounts of hafnium and/or niobium and iron-based surfacing alloys containing the prescribed amounts of silicon in conjunction with the prescribed amount of carbon are deposited in a molten state such as by a welding process onto a nitrogen containing steel alloy substrate, a substantial decrease in porosity of the surfacing alloy results.

Although of particular advantage for coating nitrogen bearing steel substrates, the low porosity surfacing alloys of the invention may, of course, be used as a surface coating on any article of manufacture for which the properties associated therewith are desired.

What is claimed is:

1. An improved metallic alloy adapted to be deposited in a molten state by a weld surfacing process upon a nitrogen containing steel substrate to provide a wear resistant surface thereupon, said alloy being substantially devoid of Tungsten and containing at least about 45.0% by weight iron to the total weight of the alloy and including the constituents:

| Constituent | % By Weight to Total Alloy Weight | |
| --- | --- | --- |
| | From About | To About |
| Carbon | 1.5 | 1.7 |
| Manganese | 0.4 | 0.55 |
| Chromium | 26.1 | 28.0 |
| Nickel | 15.0 | 16.0 |
| Molybdenum | 4.5 | 5.5 |
| Silicon | 1.5 | 2.0 |
| Phosphorus | 0.0 | 0.01 |
| Sulfur | 0.0 | 0.01 |
| Cadmium | 0.0 | 0.01 |
| Titanium | 0.0 | 0.01 |
| Aluminum | 0.0 | 0.01 |
| Boron | 0.0 | 0.05 |
| Iron | Balance | | and said improvement characterized by said surface having reduced porosity arising from liberation of nitrogen during the process of depositing said surface upon said substrate by reason of said alloy further including silicon in the range of about 1.5% to about 2.0% by weight to the total weight of the alloy.

2. An article of manufacture having thereupon the surface provided by the iron-based alloy of claim 1.

3. An engine valve having thereupon the surface provided by the iron-based alloy of claim 1.

* * * * *